US011568640B2

(12) United States Patent
Lee et al.

(10) Patent No.: US 11,568,640 B2
(45) Date of Patent: Jan. 31, 2023

(54) TECHNIQUES FOR PROVIDING VIBRATIONS AT HEADSET

(71) Applicant: Lenovo (Singapore) Pte. Ltd., Singapore (SG)

(72) Inventors: Jonathan Co Lee, Cary, NC (US); Nathan Hatfield, Morrisville, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 16/588,478

(22) Filed: Sep. 30, 2019

(65) Prior Publication Data
US 2021/0097285 A1    Apr. 1, 2021

(51) Int. Cl.
G06V 20/20 (2022.01)
G08B 6/00 (2006.01)
G01C 21/36 (2006.01)
G06F 3/01 (2006.01)

(52) U.S. Cl.
CPC ......... *G06V 20/20* (2022.01); *G01C 21/3652* (2013.01); *G06F 3/012* (2013.01); *G06F 3/016* (2013.01); *G08B 6/00* (2013.01)

(58) Field of Classification Search
CPC .................................................. G06T 19/006
See application file for complete search history.

(56) References Cited

U.S. PATENT DOCUMENTS

| 4,045,885 | A  | 9/1977  | Stern          |
| 6,216,086 | B1 | 4/2001  | Seymour et al. |
| 6,320,496 | B1 | 11/2001 | Sokoler et al. |
| 6,798,443 | B1 | 9/2004  | Maguire, Jr.   |
| 7,899,469 | B2 | 3/2011  | Casey          |

(Continued)

FOREIGN PATENT DOCUMENTS

| CN | 101568802 B  | 4/2012 |
| CN | 107092638 A  | 8/2017 |

(Continued)

OTHER PUBLICATIONS

Corning Incorporated, "Day Made of Glass 2: Same Day Expanded Corning Vision (2012)", Feb. 3, 2012. https://youtube.com/watch?v=jZkHpNnXLBO.

(Continued)

*Primary Examiner* — Yi Yang
(74) *Attorney, Agent, or Firm* — John M. Rogitz; John L. Rogitz

(57) ABSTRACT

In one aspect, a headset may include a housing, at least one processor in the housing, a transparent display accessible to the processor and coupled to the housing, and at least first and second vibrators accessible to the processor and coupled to the housing. The first and second vibrators may be located at different positions with respect to the housing. The headset may also include storage accessible to the processor and coupled to the housing. The storage may include instructions executable by the processor to track a person as the person moves through an environment. The instructions may also be executable to, based on tracking the person, actuate one of the first and second vibrators to indicate a direction in which the person is to travel and/or to alert the person of an object that is within a threshold distance to the person.

14 Claims, 12 Drawing Sheets

(56) References Cited

U.S. PATENT DOCUMENTS

| | | | |
|---|---|---|---|
| 8,023,963 B2 | 9/2011 | Yonker et al. | |
| 8,094,091 B2 | 1/2012 | Noma | |
| 8,131,271 B2 | 3/2012 | Ramer et al. | |
| 8,150,617 B2 | 4/2012 | Manber et al. | |
| 8,229,458 B2 | 7/2012 | Busch | |
| 8,706,416 B2 | 4/2014 | Wang et al. | |
| 8,718,614 B2 | 5/2014 | Kolodziej | |
| 8,788,197 B2 | 7/2014 | Fink | |
| 8,825,387 B2 | 9/2014 | Mays et al. | |
| 8,922,480 B1 | 12/2014 | Freed et al. | |
| 8,973,149 B2 | 3/2015 | Buck | |
| 8,996,304 B2 | 3/2015 | Needham et al. | |
| 9,063,633 B2 | 6/2015 | Rajasingham | |
| 9,080,890 B2 | 7/2015 | Svendsen et al. | |
| 9,117,066 B2 | 8/2015 | Nathan et al. | |
| 9,247,779 B1 | 2/2016 | Aloumanis et al. | |
| 9,405,918 B2 | 8/2016 | Freed et al. | |
| 9,541,411 B2 | 1/2017 | Tang et al. | |
| 9,799,301 B2 | 10/2017 | Sahin | |
| 9,851,561 B2 | 12/2017 | Lu | |
| 9,898,868 B2 | 2/2018 | Aonuma et al. | |
| 10,012,508 B2 | 7/2018 | Beaumont et al. | |
| 10,257,434 B2 | 4/2019 | Arnold | |
| 10,283,081 B2 | 5/2019 | Sahin | |
| 10,324,290 B2 | 6/2019 | Weller et al. | |
| 10,437,460 B2 | 10/2019 | Moore et al. | |
| 10,464,482 B2 | 11/2019 | Shuster et al. | |
| 10,521,944 B2 | 12/2019 | Sareen et al. | |
| 10,809,081 B1 | 10/2020 | Kentley-Klay et al. | |
| 10,916,216 B2 | 2/2021 | Sahin | |
| 10,991,292 B2 | 4/2021 | Shin et al. | |
| 2007/0015519 A1 | 1/2007 | Casey | |
| 2007/0194902 A1 | 8/2007 | Blanco et al. | |
| 2007/0229396 A1 | 10/2007 | Rajasingham | |
| 2007/0266239 A1 | 11/2007 | Vismans et al. | |
| 2007/0273697 A1* | 11/2007 | Zaman | G06F 19/321 345/501 |
| 2008/0001847 A1 | 1/2008 | Kratchounova et al. | |
| 2008/0046176 A1 | 2/2008 | Jurgens | |
| 2008/0120029 A1* | 5/2008 | Zelek | G01C 21/20 701/469 |
| 2008/0214157 A1 | 9/2008 | Ramer et al. | |
| 2008/0248815 A1 | 10/2008 | Busch | |
| 2009/0186628 A1 | 7/2009 | Yonker et al. | |
| 2009/0216438 A1 | 8/2009 | Shafer | |
| 2009/0292528 A1 | 11/2009 | Kameyama | |
| 2010/0023252 A1 | 1/2010 | Mays et al. | |
| 2010/0138858 A1* | 6/2010 | Velazquez | H04N 21/8146 725/33 |
| 2010/0248745 A1 | 9/2010 | Ozawa et al. | |
| 2011/0144902 A1 | 6/2011 | Forte et al. | |
| 2011/0270522 A1 | 11/2011 | Fink | |
| 2011/0301835 A1 | 12/2011 | Bongiorno | |
| 2012/0130630 A1 | 5/2012 | Tang et al. | |
| 2012/0150431 A1* | 6/2012 | Ooka | G01C 21/3652 701/425 |
| 2012/0208559 A1 | 8/2012 | Svendsen et al. | |
| 2012/0242591 A1 | 9/2012 | Kawalkar | |
| 2012/0284281 A1 | 11/2012 | Meyer et al. | |
| 2013/0006521 A1 | 1/2013 | Needham et al. | |
| 2013/0029685 A1 | 1/2013 | Moshfeghi | |
| 2013/0122937 A1 | 5/2013 | Meyer et al. | |
| 2013/0127980 A1 | 5/2013 | Haddick et al. | |
| 2013/0217366 A1 | 8/2013 | Kolodziej | |
| 2013/0261966 A1 | 10/2013 | Wang et al. | |
| 2013/0321257 A1 | 12/2013 | Moore et al. | |
| 2014/0018106 A1 | 1/2014 | Fulger et al. | |
| 2014/0057657 A1 | 2/2014 | Manber et al. | |
| 2014/0125789 A1 | 5/2014 | Bond et al. | |
| 2014/0201844 A1 | 7/2014 | Buck | |
| 2014/0214267 A1 | 7/2014 | Sellschopp | |
| 2014/0375683 A1* | 12/2014 | Salter | G02B 27/0172 345/633 |
| 2015/0116212 A1 | 4/2015 | Freed et al. | |
| 2015/0119667 A1* | 4/2015 | Reihman | A61B 5/0002 600/365 |
| 2015/0193819 A1 | 7/2015 | Chang | |
| 2015/0317956 A1 | 11/2015 | Lection et al. | |
| 2016/0093106 A1* | 3/2016 | Black | G06K 9/00671 345/633 |
| 2016/0104451 A1 | 4/2016 | Sahin | |
| 2016/0154240 A1 | 6/2016 | Lee et al. | |
| 2016/0171771 A1* | 6/2016 | Pedrotti | G02B 27/017 345/633 |
| 2016/0189442 A1 | 6/2016 | Wright | |
| 2016/0224106 A1 | 8/2016 | Liu | |
| 2016/0350973 A1* | 12/2016 | Shapira | G06F 3/017 |
| 2017/0032787 A1* | 2/2017 | Dayal | G01C 21/3602 |
| 2017/0078529 A1 | 3/2017 | Datikashvili et al. | |
| 2017/0124881 A1* | 5/2017 | Whitehead | B60Q 9/008 |
| 2017/0176746 A1 | 6/2017 | Weller et al. | |
| 2017/0184846 A1 | 6/2017 | Lu | |
| 2017/0197617 A1* | 7/2017 | Penilla | G08G 1/163 |
| 2017/0329139 A1 | 11/2017 | Shearman et al. | |
| 2018/0005503 A1* | 1/2018 | Kaindl | G08G 1/005 |
| 2018/0108322 A1 | 4/2018 | Sahin | |
| 2018/0249087 A1 | 8/2018 | Arnold | |
| 2018/0299888 A1* | 10/2018 | Sullivan | G05D 1/0088 |
| 2018/0315247 A1* | 11/2018 | Van Andel | G06K 9/00342 |
| 2019/0014206 A1* | 1/2019 | Kuhn | G03F 1/24 |
| 2019/0057531 A1 | 2/2019 | Sareen et al. | |
| 2019/0126824 A1 | 5/2019 | Oba | |
| 2019/0293943 A1 | 9/2019 | Weller et al. | |
| 2019/0303626 A1 | 10/2019 | Kaladgi et al. | |
| 2019/0392779 A1 | 12/2019 | Sahin | |
| 2020/0193068 A1 | 6/2020 | Jones | |
| 2020/0226966 A1 | 7/2020 | Shin et al. | |
| 2021/0120213 A1 | 4/2021 | Beni | |

FOREIGN PATENT DOCUMENTS

| | | |
|---|---|---|
| EP | 0578788 A1 | 1/1994 |
| GB | 201018815 | 12/2010 |
| JP | 3669702 B2 | 7/2005 |
| JP | 4547721 B2 | 9/2010 |
| JP | 5487677 B2 | 5/2014 |
| KR | 100763238 B1 | 10/2007 |
| WO | 2015133889 A1 | 9/2015 |

OTHER PUBLICATIONS

Liviu, Marica, "Back Seat Transparent Touchscreen Window", Jul. 24, 2011, https://www.youtube.com/watch?v=ct6dpX7dZzl.

Tonnis and Klinker, "Effective Control of a Car Driver's Attention for Visual and Acoustic Guidance towards the Direction of Imminent Dangers", 2006, Proceedings of the ISMAR. 13-22, 2006/10/01, 10.1109/ISMAR.2006.207789.

Nii U SiNG Party Official Trailer, 2013, https://www.youtube.com/watch?v=TGdnj7APnJo.

Hatfield et al., "Presentation of Graphical Objects on Display Based on Input From Rear-Facing Camera", file history of related U.S. Appl. No. 15/930,354, filed May 12, 2020.

Beaumont et al., "Providing Directions to a Location in a Facility", file history of related U.S. Appl. No. 14/638,542, filed Mar. 4, 2015, now U.S. Pat. No. 10,012,508 issued Jul. 3, 2018.

Hatfield et al., "Presentation of Graphical Objects on Display Based on Input From Rear-facing Camera", related U.S. Appl. No. 15/930,354, Non-Final Office Action dated Feb. 3, 2021.

Hatfield et al., "Presentation of Graphical Objects on Display Based on Input From Rearfacing Camera", related U.S. Appl. No. 15/930,354, Applicant's response to Non-Final Office Action filed Apr. 8, 2021.

* cited by examiner

TECHNIQUES FOR PROVIDING VIBRATIONS AT HEADSET

FIELD

The present application relates to technically inventive, non-routine solutions that are necessarily rooted in computer technology and that produce concrete technical improvements.

BACKGROUND

As recognized herein, current augmented reality systems are limited in their functionality in that they only provide certain limited ways for user interaction. There are currently no adequate solutions to the foregoing computer-related, technological problem and the present application recognizes the need for an improved computer-based user interface that improves the functionality and ease of use of such augmented reality systems.

SUMMARY

Accordingly, in one aspect a headset includes a housing, at least one processor in the housing, a transparent display accessible to the at least one processor and coupled to the housing, and at least first and second vibrators accessible to the at least one processor and coupled to the housing. The first and second vibrators are located at different positions with respect to the housing. The headset also includes storage accessible to the at least one processor and coupled to the housing. The storage includes instructions executable by the at least one processor to track a person as the person moves through an environment. The instructions are also executable to, based on tracking the person, actuate one of the first and second vibrators to indicate a direction in which the person is to travel and/or to alert the person of an object that is within a threshold distance to the person. The person may be tracked at least in part using computer vision.

In some examples, the instructions may indeed be executable to, based on tracking the person, actuate one of the first and second vibrators to indicate a direction in which the person is to travel. Furthermore, one of the first and second vibrators may be actuated to indicate the direction in which the person is to travel as part of a navigational assistance application executed by the headset to navigate the person to a destination. In some of these examples, the instructions may be executable to, based on a determination that the person is deviating from a route to the destination, actuate one of the first and second vibrators to indicate the direction in which the person is to travel.

Also in some examples, the instructions may indeed be executable to, based on tracking the person, actuate one of the first and second vibrators to alert the person of an object that is within a threshold distance to the person. In some examples, the instructions may be executable to both use computer vision to determine that the object is within the threshold distance to the person and to use augmented reality (AR) processing to present a graphic on the transparent display that indicates the location of the object. If desired, in some implementations the instructions may also be executable by the at least one processor to actuate one of the first and second vibrators to alert the person of the object that is within the threshold distance to the person based on an accessibility setting for the headset being enabled. Further, the instructions may be executable to receive user input indicating the object as one for which to alert the person in the future when the person is within the threshold distance of the object and, based on the user input, perform the actuation of one of the first and second vibrators to alert the person of the object that is within the threshold distance to the person.

Still further, in some implementations the instructions may be executable to, based on tracking the person and at a first time, actuate one of the first and second vibrators to indicate a direction in which the person is to travel. Based on tracking the person and at a second time different from the first time, the instructions may also be executable to actuate one of the first and second vibrators to indicate a direction in which the person is to look prior to taking another action related to travel.

Additionally, in some examples the instructions may be executable to access data related to vibration to apply at the headset in conformance with physical therapy for the person and use at least one of the first and second vibrators to apply vibration at the headset according to the data.

Still further, in some examples the instructions may be executable to receive user input indicating an amount of vibration to apply to indicate the direction in which the person is to travel and/or to alert the person of objects that are within the threshold distance to the person. The instructions may then be executable to actuate one of the first and second vibrators in conformance with the user input.

As another example, in some implementations the instructions may be executable to receive user input indicating that another notification type is to be used along with vibration and, based on tracking the person and based on the user input, provide a notification of the other notification type to indicate the direction in which the person is to travel and/or to alert the person of the object that is within the threshold distance to the person. The instructions may then be executable to, concurrently with providing the notification of the other notification type, actuate one of the first and second vibrators to indicate the direction in which the person is to travel and/or to alert the person of the object that is within the threshold distance to the person.

In another aspect, a method includes tracking, using a headset and computer vision, a person as the person moves through an environment. The method also includes, based on tracking the person, actuating at least one vibrator on the headset to indicate a direction in which the person is to travel and/or to alert the person of an object that is within a threshold distance to the person.

In some examples, the method may include receiving user input indicating the object as one for which to alert the person and receiving user input indicating a particular distance for the headset to use as the threshold distance. The method may then include actuating the at least one vibrator on the headset to alert the person of the object when within the threshold distance to the person based on both the user input indicating the object as one for which to alert the person and the user input indicating the particular distance.

In another aspect, at least one computer readable storage medium (CRSM) that is not a transitory signal includes instructions executable by at least one processor of a headset to track, using computer vision, a person as the person moves through an environment. The instructions are also executable to, based on tracking the person, actuate at least one vibrator on the headset to indicate a direction in which the person is to travel and/or to alert the person of an object that is within a threshold distance to the person.

In some examples, the instructions may also be executable to, based on tracking the person in a first instance, actuate a first vibrator on the headset to alert the person of an object that the person has tagged as a first object for which to be alerted. Then based on tracking the person in a second instance at a later time than the first instance, the instructions may be executable to actuate a second vibrator on the headset to alert the person of a second object that the person has tagged as an object for which to be alerted. In these examples, the second object may be different from the first object and the second vibrator may be different from the first vibrator.

The details of present principles, both as to their structure and operation, can best be understood in reference to the accompanying drawings, in which like reference numerals refer to like parts, and in which:

DETAILED DESCRIPTION

Figure 1:
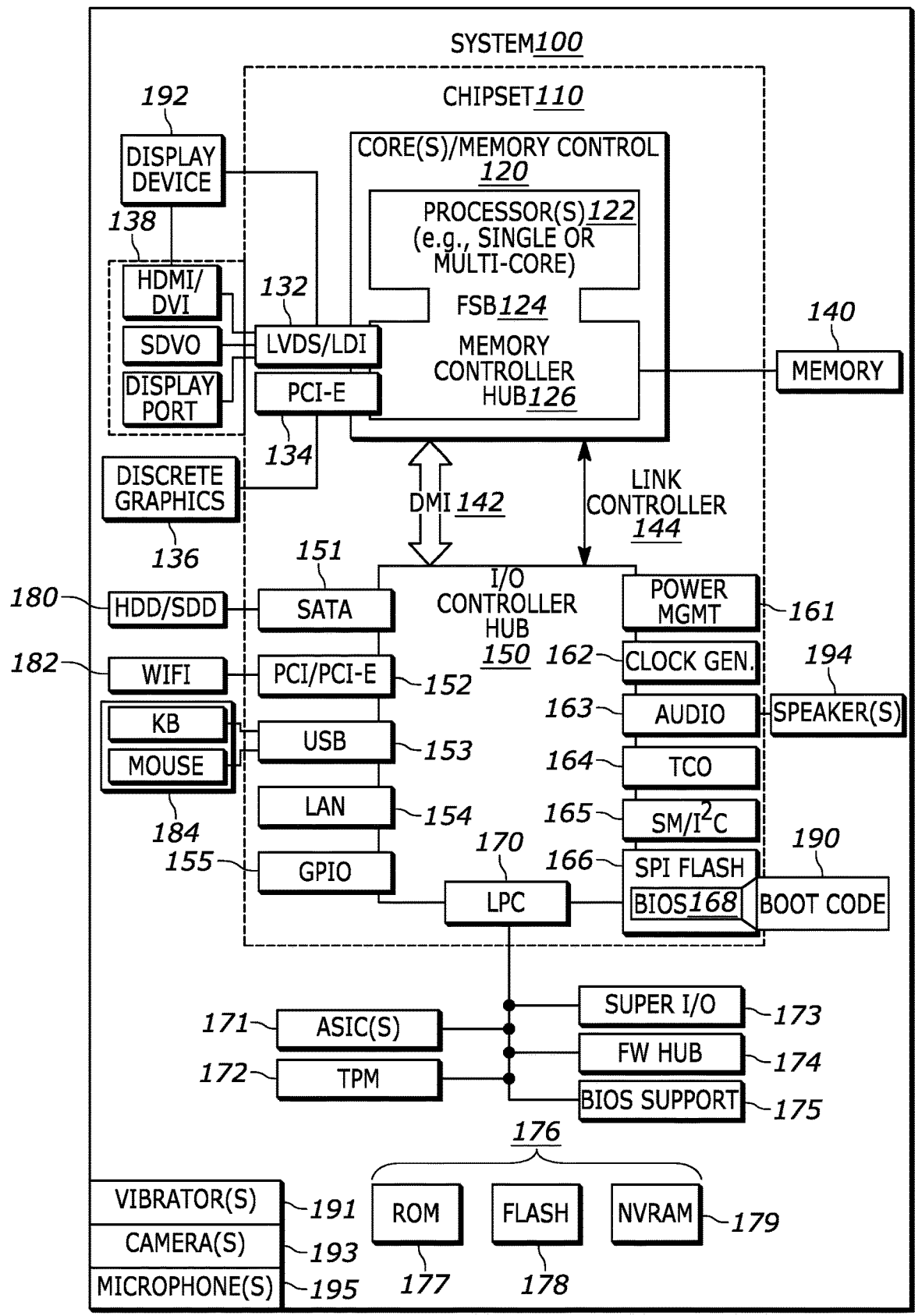
FIG. 1 is a block diagram of an example system consistent with present principles.

Among other things, the present application discloses systems and methods for using haptic and tactile feedback in augmented reality hardware and software to improve the functionality and computer-based user interfaces of AR devices while also improving their ease of use. For instance, haptic feedback at an AR device may be used to provide navigational and directional feedback so that, e.g., users that may want to navigate somewhere can receive a vibration when they go off-course.

Haptic feedback at an AR device may also be used to provide accessibility solutions for navigation and wayfinding by people with special needs or disabilities, such as to assist a visually-impaired user to navigate through space. This is based on the understanding that users with visual impairments often have difficulty maintaining a straight path when walking, increasing travel times and their risk of injury. Auditory notifications to help these users are often insufficient as the audio cannot always be deciphered in an environment with a lot of background noise. Thus, the present application discloses using haptic feedback for people such as visually impaired users to communicate potential obstacles to them that might be occluding the users' pathways.

For example, a user might receive a slight vibration on one side of their AR headset when they are approaching an object in that direction. The haptic feedback vibration may thus give the user a warning that they are coming close to the object.

As another example, a first user might be walking down a sidewalk and encounter a tree that has fallen on the sidewalk. The first user's headset may not only alert the first user of the tree via headset vibration after recognizing it using object recognition, but may also map the tree to its current physical geolocation. Then when another user is walking down the same sidewalk at a later time, that other user's headset may have already been provided with or otherwise have access to the geolocation data for the fallen tree to know the tree is blocking that user's path as well. Based on that data, the other user's headset may therefore provide directions to divert the other user to another sidewalk and away from the tree, and/or to pre-alert the other user via vibrations or other alerts before the other user's headset even "sees" the tree via its own computer vision. For example, a vibration may be provided at the other user's headset along with an auditory notification indicating "tree is blocking the sidewalk in 10 meters" even if the other user's headset has not yet recognized the tree via its own camera input and object recognition.

In addition, the present application provides for users such as those with memory impairments to place haptic-based reminders in specific geo-spatial locations to create location-based haptic notifications, with location being tracked using simultaneous localization and mapping (SLAM) for example.

Accordingly, computer vision using an AR headset's camera may be employed in one or more of these examples to track users as they move about a space and/or navigate through an environment.

Additionally, the present application also provides for using haptic feedback for force simulation. For example, physical therapy applications may simulate resistance during head and neck related motor movements to rehabilitate a person from an injury or improve their neck strength.

Haptic feedback as disclosed herein may also be customized by users. For example, users can select multi-sensory feedback pairings (e.g., haptic and audio, haptic and visual, or all of haptic, visual, and audio) to increase immersion and sensory reinforcement. Users may also be allowed to select or adjust the Hertz (Hz) rate at which vibrotactile messages are conveyed.

Furthermore, present principles may be used in conjunction with other technologies such as artificial intelligence (using artificial neural networks), machine learning, and computer vision. For an artificial intelligence (AI) model, for example, a user can communicate with an AR headset to create predictive behavior that can be later inferred by the AI model, such as setting specific types of notifications (e.g., "Alert me when the food is finished cooking in the oven") for the AI model to automatically set those types of notifications in the future without user input each time.

In terms of machine learning, a user's behaviors can be learned and inferred over time and the accuracy of an AI model employing machine learning can thereby adapt to the user's behaviors and act accordingly. For example, where a person is training to perform a particular task or activity, AR technology as disclosed herein may adapt as the user gets better with the task or activity. Take golf, for example. A user may receive a vibration when their vision shifts from the ball to the fairway too early as they swing a golf club to strike the ball, and as the user's vision shifts less with each swing as the user learns a proper golf swing, the intensity of the vibration may be less and/or triggered by a lower sensitivity threshold, and the AI model may thereby adapt as the user gets better over time to further refine the user's golf swing. To this end, supervised or unsupervised training of one or more deep or recurrent neural networks in the AI model may occur to optimize the neural network(s) used for inferring a proper golf swing (or other metric) given the user's unique swing characteristics, unique body dimensions, and objective parameters of an acceptable golf swing. For example, optimization/training may occur using one or more classification algorithms and/or regression algorithms along with inputs of video and/or motion data of the user's golf swing and body characteristics themselves. Training of an AI model may occur in other situations as well, such as training a person to drive a vehicle as will be discussed further below.

As far as computer vision goes and as referenced above, it may utilize what one or more cameras on the headset "see", and thus haptics may alert the user of objects coming too close to the camera and therefore too close to the user. As an example, vibrations could start small and build as an object gets progressively closer to the user to provide a form of alert about the object.

Prior to delving into the details of the instant techniques, with respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include one or more vibrators 191 consistent with present principles. Each of the vibrators 191 may be established by an electric motor connected to an off-center and/or off-balanced weight via the motor's rotatable shaft. The shaft may then rotate under control of the motor to create vibration.

The system 100 may further include an audio receiver/microphone 195 that provides input from the microphone 195 to the processor 122 based on audio that is detected, such as via a user/person providing audible input to the microphone 195. Still further, the system 100 may include a camera 193 that gathers one or more images and provides input related thereto to the processor 122. The camera 193 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
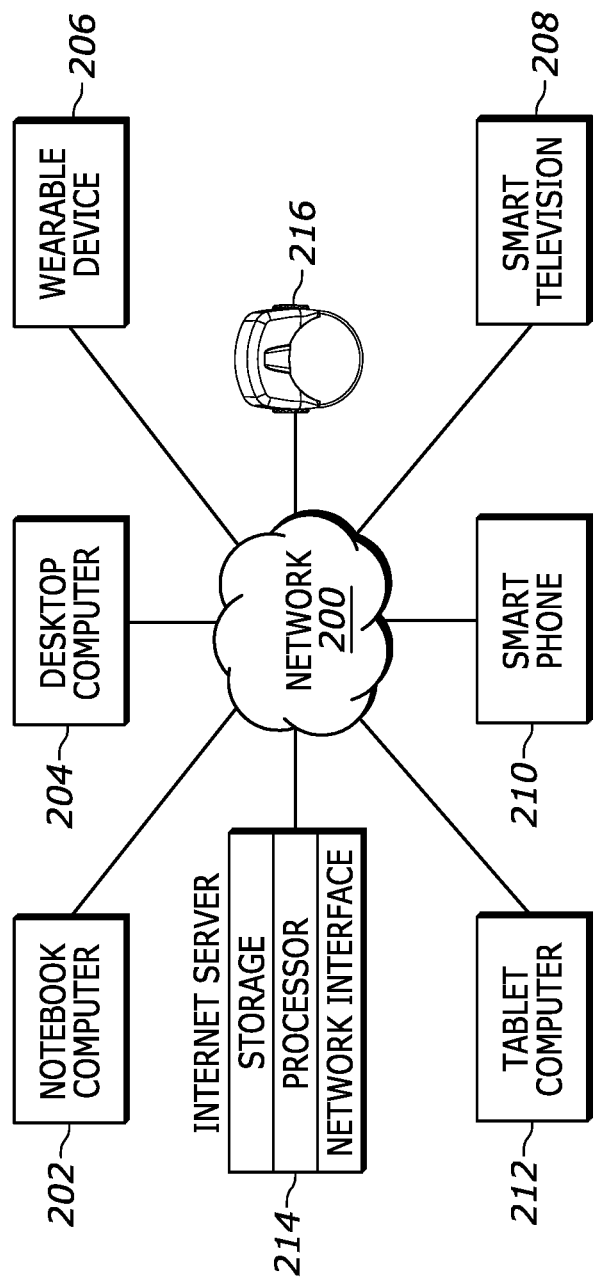
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, 216. It is to be understood that the devices 202-216 are configured to communicate with each other over the network 200 to undertake present principles.

Figure 3:
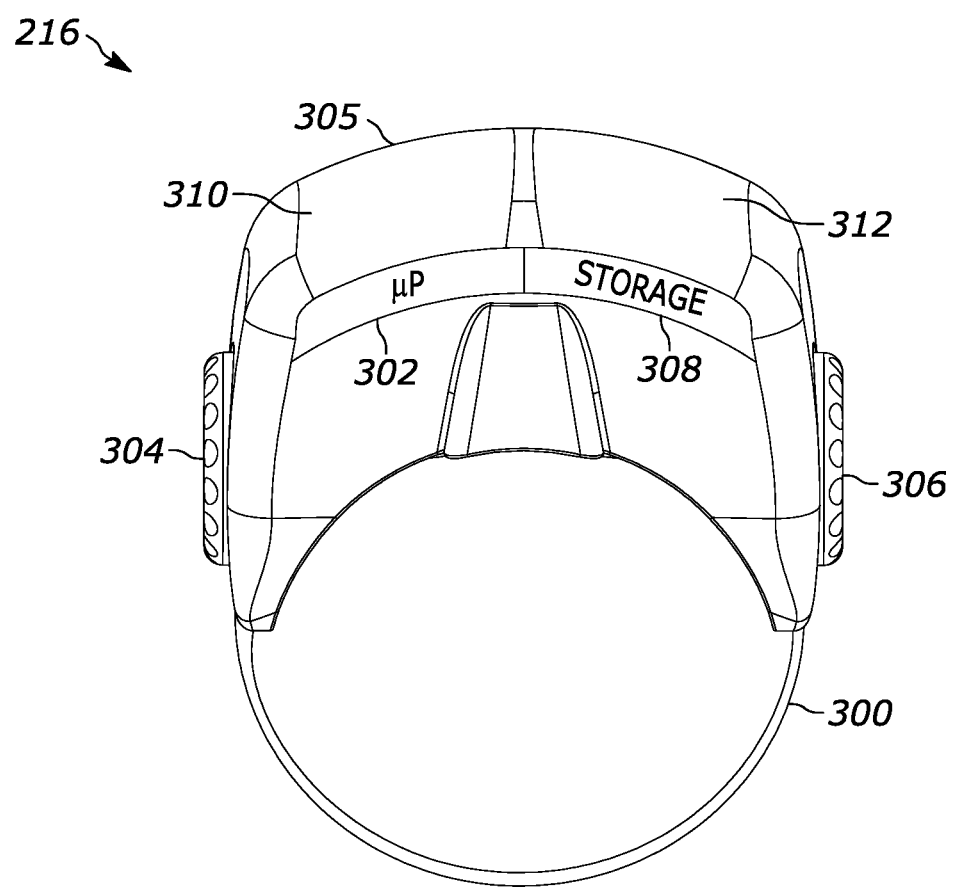
FIG. 3 shows an example augmented reality (AR) headset consistent with present principles.

Now describing FIG. 3, it shows a perspective view of a headset, such as the headset 216, consistent with present principles. The headset 216 may include a housing 300, at least one processor 302 in the housing, and a transparent "heads up" display 305 accessible to the at least one processor and coupled to the housing. The headset 216 may also include a first vibrator 304 and a second vibrator 306 on opposing sides of the housing 300 adjacent to the display 304. The vibrators 304, 306 may be accessible to the processor 302 and coupled to the housing 300 and may be similar in function and configuration to the vibrator 191 described above. Additionally, the headset 316 may include storage 308 accessible to the processor 302 and coupled to the housing 300, as well as one or more cameras 310, 312 accessible to the processor 302 and coupled to the housing 300 for use during execution of computer vision as disclosed herein.

Still further, note that the headset 216 may include still other components not shown for simplicity, such as a network interface for communicating over a network such as the Internet and a battery for powering components of the headset 216 such as the vibrators 304, 306. Additionally, note that while the headset 216 is illustrated as computerized smart glasses, the headset 216 may also be established by another type of augmented reality (AR) headset, or even a virtual reality (VR) headset in some examples that may not have a transparent display but is still be able to present virtual AR objects along with a real-world, real-time camera feed of an environment imaged by one or more of the cameras 310, 312 to provide an AR experience to the user. Also note that electronic contact lenses with their own respective heads up displays may also be used consistent with present principles.

Figure 4:
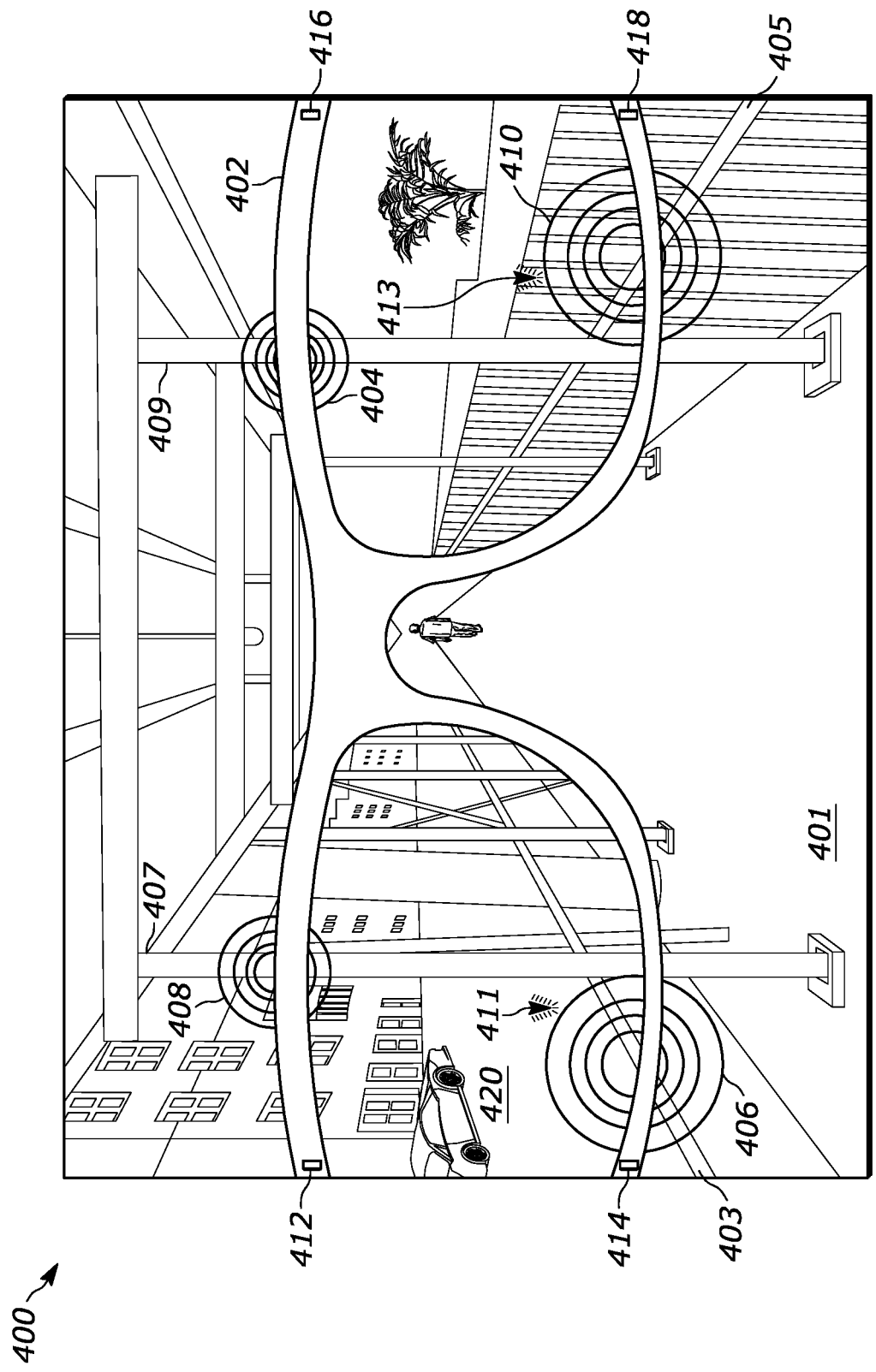
FIGS. 4 and 5 show example illustrations of the perspective of a person while wearing an AR headset and the headset providing vibrations consistent with present principles.

Now in reference to FIG. 4, it shows an example consistent with present principles in which a perspective is shown of a user/person while wearing AR glasses 402 and looking through its transparent display 420. It is to also be understood in reference to FIG. 4 that the person is walking through an environment 400 that is a public place including a city street 401. Further, note in this example that the glasses 402 may include four vibrators 412, 414, 416, and 418 at various locations on the housing of the glasses 402, such as at respective outer top and bottom corners of the eye wires/rims surrounding the lens/transparent display combination 420.

As illustrated in FIG. 4, as the person walks along the street 401, various vibrations as illustrated by elements 404, 406, 408, and 410 may be progressively provided as a person comes within a threshold distance of each respective object. Thus, when the person comes within a threshold distance of a first object to the bottom left relative to the perspective of the person, vibrator 414 may be actuated to provide a vibration as illustrated by element 406 to indicate the person is within the threshold distance to the respective object (a horizontal bar 403 of scaffolding). At around the same time, the person may also come within the threshold distance of a second object to the bottom right relative to the perspective of the person and so vibrator 418 may be actuated to provide a vibration as illustrated by element 410 to indicate the person is within the threshold distance to another object (another horizontal bar 405 of the scaffolding). Also note that in some examples the glasses 402 may use AR processing to present graphics 411, 413 on the transparent display to respectively indicate the locations of the first and second objects. In the present example, the graphics 411, 413 include three-dimensional (3D) arrows pointing toward the objects in 3D space relative to the current position of the person and may even include impact graphics like lines emanating from the end of the arrows to indicate a potential collision.

Then at a later time as the person progresses down the street 401, the person may come within the threshold distance of a third object to the upper left relative to the perspective of the person. Thus, the vibrator 412 may be actuated to provide a vibration as illustrated by element 412 to indicate the person is within the threshold distance to yet another object (an upright bar 407 of the scaffolding). At about the same time, another upright bar 409 of the scaffolding on the opposite side of the street 401 may also come within the threshold distance to the person on the upper right relative to the person's perspective, and accordingly vibrator 416 may be actuated to provide a vibration as illustrated by element 404.

It may therefore be appreciated based on FIG. 4 that a person may be assisted in navigating an environment through haptic vibrations provided at the glasses 402. This might be particularly useful for, e.g., the visually impaired to avoid collisions and injury with objects the person might otherwise bump into. However, also note that in some embodiments the person might consistently get alerts for the same object and find them annoying, and thus the person may "snooze" alerts for that object by providing voice input or selecting a "snooze" selector that might be presented on the display 420 to command the glasses 402 to stop providing alerts for that object regardless of the person's distance to it. The glasses 402 may then stop providing alerts for that object for an indefinite period of time, or for a threshold non-zero period of time as may be specified by the person with the command (e.g., only one hour).

Figure 5:
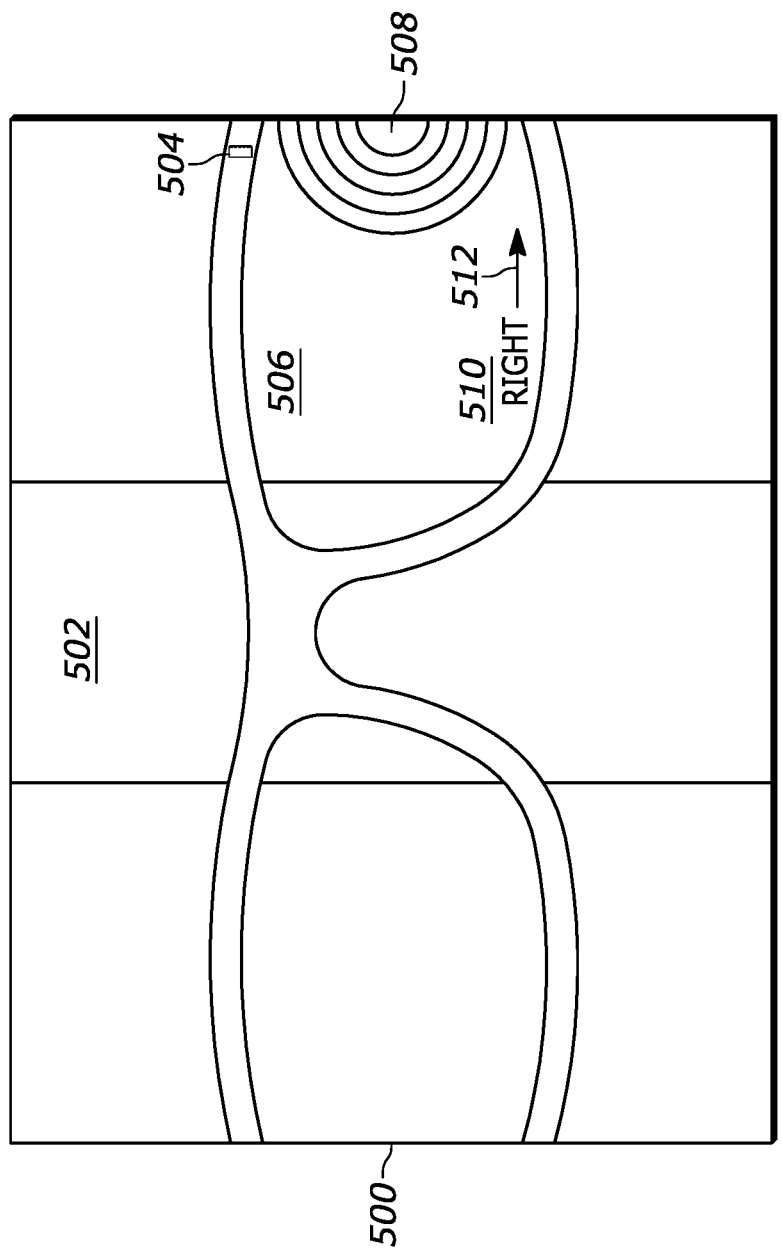

FIG. 5 shows another example consistent with present principles. FIG. 5 illustrates the perspective of a person while wearing AR glasses 500 and walking down a sidewalk 502. Note that the AR glasses 500 may be executing a navigational assistance application (similar to, e.g., Google Maps, Waze, etc.) to navigate the person to a destination. Based on a determination that a right turn is upcoming for the person to continuing traveling to the destination, a vibrator 504 on the housing of the glasses 500 above the right lens 506 may be actuated to indicate the right turn based on the correspondence of right lens 506 or right vibrator 504 to right turn. Illustrated vibrations 508 are shown as generated by the vibrator 504.

Also note that in some examples other notification types may be presented concurrently with vibration notifications to indicate upcoming turns to follow directions to the destination. For example, text 510 indicating "right" may be presented along with a graphical arrow 512 indicating a right turn. Audio may also be provided through one or more speakers on the headset 500, such as audio for the person to "turn right at the next intersection".

Figure 6:
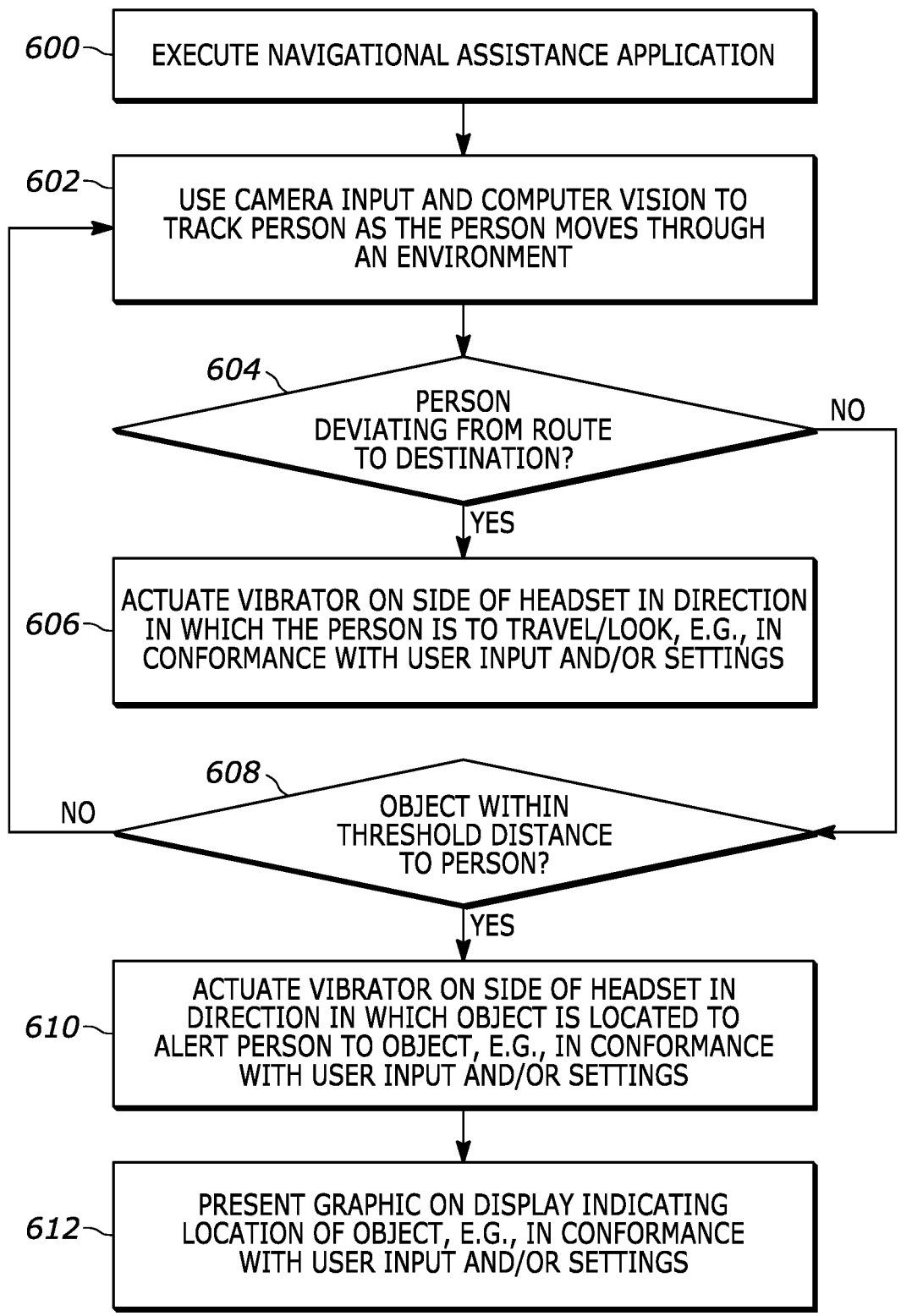
FIG. 6 is a flow chart of an example algorithm for an AR headset to provide vibrations while a person navigates about an environment consistent with present principles.

Referring now to FIG. 6, it shows example logic that may be executed by a device such as the system 100 and/or a headset consistent with present principles. Beginning at block 600, the device may begin executing a navigational assistance application, receive user input of a destination to which to travel, and begin outputting directions to the destination.

The logic may then move to block 602 where the device may receive input from one or more cameras coupled to the device (or even disposed elsewhere in the environment) and use the input and computer vision to track the person as the person moves through the environment to the destination on foot, by car, etc. In terms of computer vision, it is to be understood that in at least some examples computer vision may include the type of computer/machine vision used in augmented reality (AR) processing to determine the real world location of real world objects relative to each other and relative to the headset. Thus, computer vision may include image registration, and/or receiving and analyzing digital images to extract three dimensional data from the images for location reference. To this end, artificial intelligence models employing one or more neural networks may be used for making inferences about and/or mapping the real world locations of objects with respect to each other as shown in images from one or more cameras. Simultaneous localization and mapping (SLAM) algorithms may also be used.

From block 602 the logic may then proceed to decision diamond 604. At diamond 604 the device may determine whether the person is deviating from a route to the destination that is determined by the navigational assistance application and being followed by the person. The determination may be made, for instance, by tracking the person via the computer vision to determine that the person has veered off the route, although input from a GPS transceiver on the headset may also be used.

Responsive to an affirmative determination at diamond 604, the logic may proceed to block 606. At block 606 the device may actuate a vibrator on a side of the headset in the direction in which the person is to travel to get back on course (e.g., the right side). Also note that in some examples where the person is driving and should make a turn to get back on course, at a different time prior to actuating the vibrator to indicate the direction in which the person is to travel the headset may provide a different vibration using the vibrator on the right side of the headset to indicate that the person should look in his or her vehicle's blind spot before making the right turn.

Different vibration patterns to indicate different things may therefore be used consistent with present principles, such as a constant vibration for a certain length of time to indicate the turn itself, and periodic vibrations separated by equal lengths of time but also for the same particular total length of time to indicate to look in the vehicle's blind spot. Yet another vibration pattern may even be used if the driver takes his or her eyes off the road and looks down at his/her cell phone or otherwise takes his/her eyes off the road, as may be determined based on the computer vision and/or eye tracking. Still another vibration pattern (or even higher vibration intensity) may be used where the device determines using biometric sensor data and/or sleep tracking that the driver (e.g. a semi-trailer truck driver) is falling or has fallen asleep while driving to thus alert the driver to keep awake while driving. Also note that the vibrations provided at block 606 may be provided in conformance with user input and/or configured settings, such as a particular vibration intensity selected by the person as will be described further below in reference to FIG. 16.

However, still in reference to FIG. 6 but referring back to decision diamond 604, note that a negative determination at diamond 604 may cause the logic to proceed to decision diamond 608 instead of block 606. At diamond 608 the device may determine, based on the computer vision that is being executed, whether an object has come within a threshold distance to the person. The threshold distance may be three feet, for example, and may be set by the person prior to execution of the logic of FIG. 6.

A negative determination at diamond 608 may cause the logic to revert back to block 602 and proceed therefrom. However, an affirmative determination at diamond 608 may instead cause the logic to proceed to block 610.

At block 610 the device may actuate a vibrator on a side of the headset in the direction of the object to alert the person to the presence of the object within the threshold distance. Different vibration patterns may even be used to indicate different object types or sizes, such as a constant vibration for a certain length of time to indicate inanimate objects and/or objects above a threshold size, and periodic vibrations separated by equal lengths of time but also for the same particular total length of time to indicate living objects and/or objects below the threshold size. Different vibration intensities may also be used so that, for example, a more intense vibration may be provided for an object above a threshold size while a lesser vibration may be provided for an object below the threshold size.

Also note that the vibrations provided at block 610 may be provided in conformance with user input and/or configured settings. For example, vibrations may be provided when the person comes within the threshold distance to particular objects already tagged by the person as objects for which to provide alerts when the person is within the threshold distance, as will be described further below in reference to FIG. 11. As another example, various vibration intensities selected by the person may be used as will be described further below in reference to FIG. 16.

From block 610 the logic may then proceed to block 612. At block 612 the device may, concurrent with actuating a vibrator to vibrate the headset at block 610, also present a graphic on the headset's display that indicates the current location of the object that has been determined at diamond 608 to be within the threshold distance to the person. For instance, an arrow may be presented on the headset's display pointing to the object. Also at block 610, audio indicating the location of the object may also be presented, such as "scaffolding pole three feet to your left". Which types of notifications the headset is to present at block 612 may be based on user input specifying notification types, as will be described further below in relation to FIG. 16.

Figure 7:
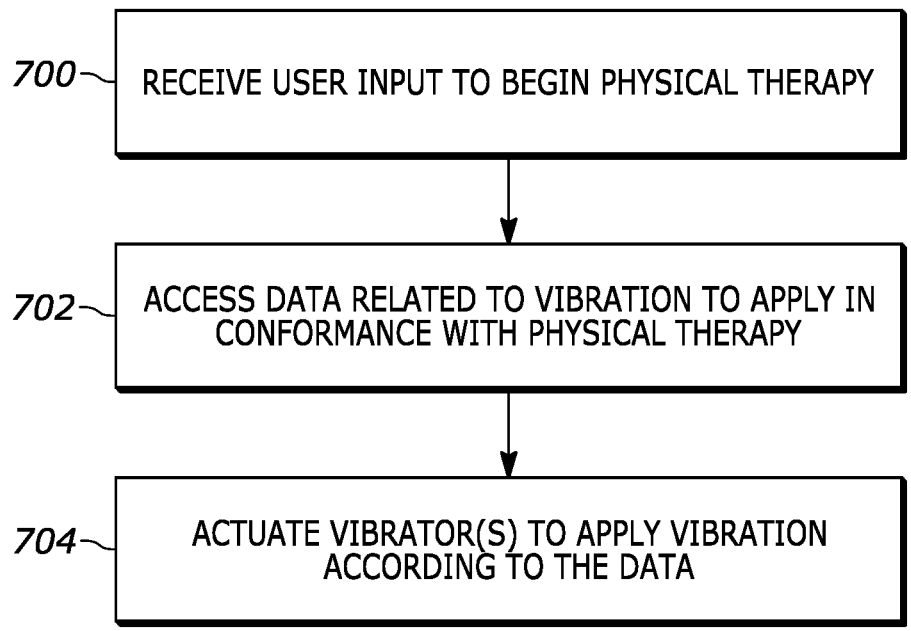
FIG. 7 is a flow chart of an example algorithm for an AR headset to provide vibrations to assist with a person's physical therapy consistent with present principles.

FIG. 7 will now be described. It shows example logic executable by a headset consistent with present principles in order to provide physical therapy to a person via vibrators in the headset. This might be useful if the person is to do physical therapy to rehabilitate a head or neck injury, for example. Also, note that the logic of FIG. 7 may be executed in conjunction with or separate from the logic of FIG. 6.

Beginning at block 700, the device may receive input to begin physical therapy, such as input to the GUI 1200 of FIG. 12 that will be described later. From block 700 the logic may then proceed to block 702 where the device may access data related to vibration(s) to apply in conformance with the person's prescribed physical therapy. The data may be stored at the headset itself or at a remotely located server accessible to the headset, but in either case the data may be established by the person's physical therapist and/or an artificial intelligence algorithm in conjunction with the physical therapist to determine respective vibrators on the headset to actuate at different times in conformance with action to be taken by the person for physical therapy. For example, the data may specify that a message is to be presented on the headset's display instructing the person to nod his or her head up and down while also specifying that a vibrator located up and to the left of the left-side lens should be actuated along with a vibrator located down and to the right of the right-side lens (relative to the person's perspective while wearing the headset).

Accordingly, from block 702 the logic may proceed to block 704 where the headset may actuate the respective vibrators to apply vibration at the headset in conformance with the data so that the person may perform his or her physical therapy using vibrations from the headset.

Figure 8:
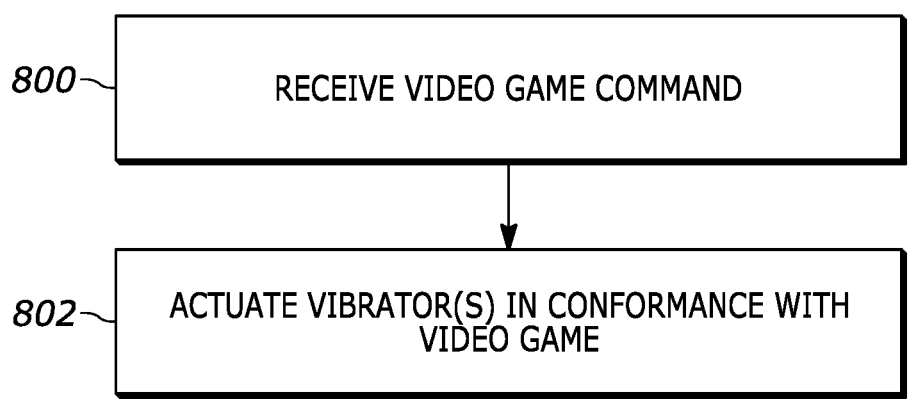
FIG. 8 is a flow chart of an example algorithm for an AR headset to provide vibrations while a person plays a video game consistent with present principles.
Figure 9:
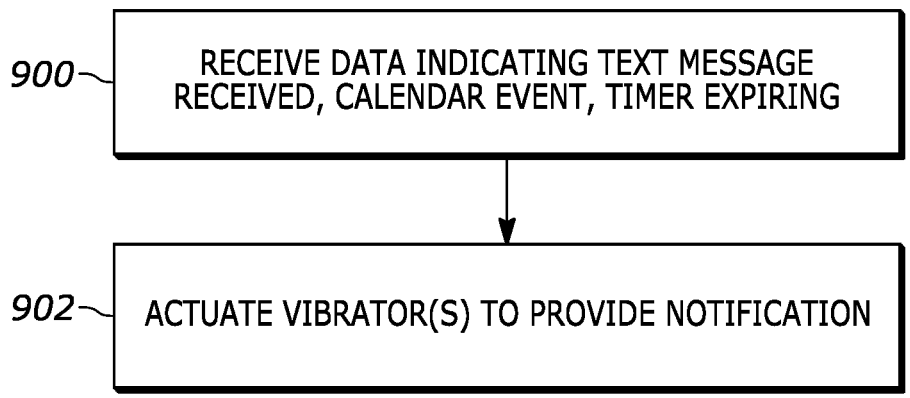
FIG. 9 is a flow chart of an example algorithm for an AR headset to provide vibrations regarding various notifications and alerts consistent with present principles.
Figure 10:
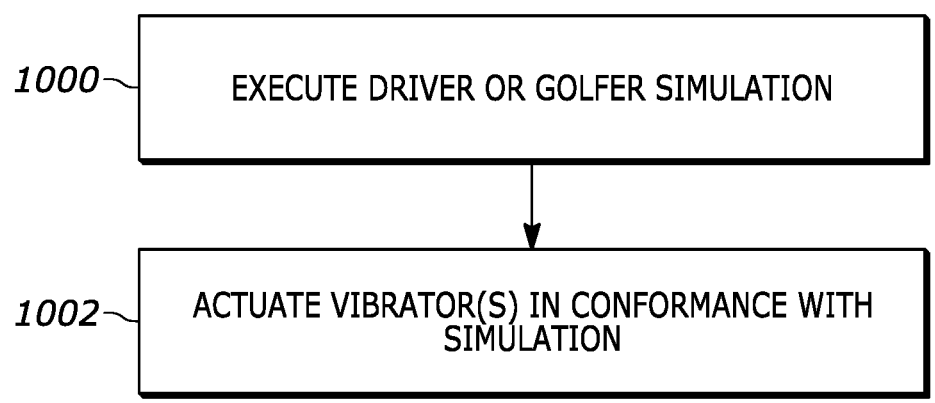
FIG. 10 is a flow chart of an example algorithm for an AR headset to provide vibrations to assist with training a person to perform a particular task or activity consistent with present principles.

FIGS. 8-10 illustrate still other example logic that may be executed by a headset with vibrators consistent with present principles. Note that the logic of these figures may be executed in conjunction with or separate from the logic of FIGS. 6 and/or 7.

Beginning first with FIG. 8, it is to be understood that vibrations may be provided at a headset while a person plays a video game. For example, vibrations at a headset may be used to simulate AR game play such as a dinosaur jumping out at the player or simulating player versus player action games.

Accordingly, at block 800 the headset may receive one or more commands to actuate vibrators on the headset, with the commands being received from a server or video game console or other device executing a video game. Which vibrators to actuate, at which intensity, and using which vibration patterns may all be specified by the video game's developer and indicated by the server/console to the headset via the command(s) received at block 800 as the person plays the video game. From block 800 the logic may then proceed to block 802 where the headset may actuate one or more vibrators coupled to it in conformance with the received command(s).

Turning to FIG. 9, it is to be understood that vibrations may be provided at a headset to provide various other alerts or notifications to a person, such as a vibration notification that a new text message or telephone call has been received at a smart phone in communication with the headset. As another example, a vibration alert may be provided at the headset that an event indicated in a person's electronic calendar that is accessible to the headset is or will transpire. Another yet example, a vibration alert may be provided that a timer for an Internet of Things (IoT) oven has expired, with the IoT oven being in communication with the headset to indicate expiration of the timer.

Accordingly, at block 900 the headset may receive or access data indicating that a text message has been received, that an event indicated in the electronic calendar is about to transpire, that an IoT oven's timer has expired, etc. From block 900 the logic may then proceed to block 902 where the headset may actuate one or more vibrators to provide an associated vibration alert or notification. Note that different vibrators, vibration intensity, and/or vibration patterns may be used for different types of notifications or alerts that the headset is to provide. For example, light periodic vibrations from a vibrator located up and to the right of a right lens of the headset may be used for providing notifications of incoming text messages while more intense, constant vibrations from a vibrator located down and to the left of a left lens of the headset may be used for providing calendar event alerts.

FIG. 10 shows additional logic consistent with present principles. It is to be understood in reference to FIG. 10 that a headset may provide vibrations during a training session to suggest or indicate good or bad behavior, such as where a person might be learning to drive a vehicle and be provided with vibration reminders to concentrate on the road, avoid distractions, and check vehicle blind spots. Training as applied to flying aircraft in civilian or military flight training as well as training for a proper golf swing may also use vibrations at a headset consistent with present principles. For example, the headset may execute computer vision while a golfer is learning how to hit a certain shot, and provide a vibration if the golfer looks up too early while swinging. The vibrations may lessen in intensity the less the person looks up during a given swing.

As shown in FIG. 10, at block 1000 the headset may execute a vehicle driver training application or golfer training application, using two of the examples from the paragraph above. The logic may then proceed to block 1002 where the headset may actuate one or more vibrators on the headset in conformance with the training/simulation. Note that the training itself may be specified or developed by a developer, and therefore the developer may specify which vibrators to actuate on the headset, at which intensity, and using which vibration patterns at various times during the simulation or training.

Figure 11:
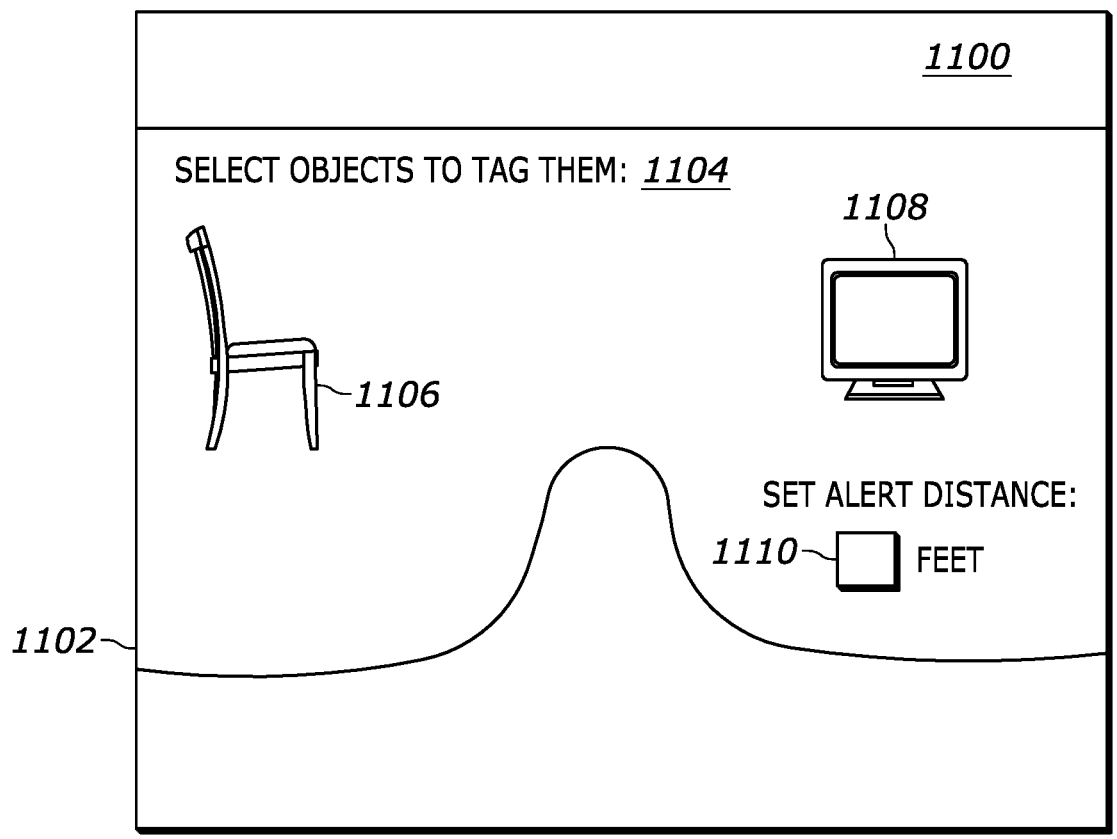
FIG. 11 shows an example illustration of the perspective of a person while wearing an AR headset to tag objects for which to receive vibration warnings consistent with present principles.

Now in reference to FIG. 11, it shows an environment 1100 in which a person is disposed. FIG. 11 illustrates the perspective of the person while observing the environment 1100 through the lens(es) of a headset 1102 such as smart glasses. Note that an indication 1104 may be presented on the headset's lens/display combination based on the person initiating a process to tag objects for which to be provided with vibration alerts when the person comes within a threshold distance of those objects as described herein. As shown, the indication 1104 may prompt the person to select one or more objects in the person's view that the person wishes to tag. The person may then make object selections by staring at a given object for a threshold amount of time or by pointing to the object, for example. Thus, cameras on the headset 1102 that are oriented toward the person's eyes may be used for the headset 1102 to perform eye tracking for the person's line of sight, while cameras on the headset 1102 that are oriented outward may be used to perform gesture recognition. The objects themselves that are stared at or gestured toward may then be identified using object recognition, which may also be used at a later time to provide alerts when the person comes within a threshold distance of the selected object.

As shown in FIG. 11, a real world chair 1106 and a real world television 1108 are shown within the field of view of the person. The person may stare at or gesture toward either one to indicate that object as an object for which to provide alerts when within the threshold distance to that respective object. The object's current geolocation (as might be determined via computer vision) may also be noted by the headset for future vibration alerts that may be provided to the person via his or her headset, or even to another user using another headset that has access to the object's geolocation and other relevant data.

Furthermore, in some examples the person may even set the threshold distance for the headset 1102 to use by first selecting the input box 1110 (e.g., via staring or voice command) and then providing input to it to establish the threshold distance (e.g., by speaking the desired distance as detected by a microphone on the headset 1102). In some examples, the person may even specify via voice command or other input the vibration intensity, vibration pattern, and even particular vibrator on the headset 1102 to use to provide an alert in reference to a particular tagged object so that different intensities, patterns, and/or vibrators may be used to alert the person when within the threshold distance to different tagged objects.

Figure 12:
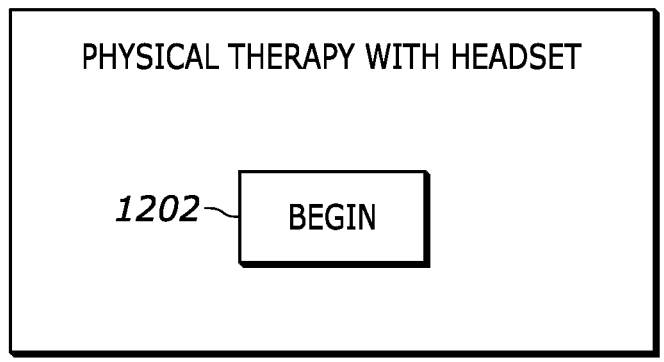
FIGS. 12 and 13 show example graphical user interfaces (GUIs) that may be presented on an AR headset display for a user to engage in physical therapy using vibrations from the headset consistent with present principles.
Figure 13:
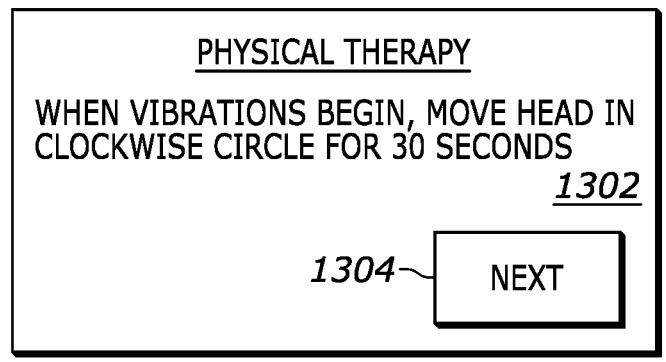

Continuing the detailed description in reference to FIGS. 12 and 13, they show example graphical user interfaces (GUIs) 1200 and 1300 that may be presented on the display of a headset consistent with present principles for a person to engage in physical therapy as described above. Referring first to FIG. 12, the GUI 1200 may be presented on the headset's display responsive to the person launching a physical therapy application or accessing an online physical therapy portal. The GUI 1200 may include a selector 1202 that may be selectable by voice command or staring to begin a physical therapy program.

Then responsive to selection of the selector 1202, the GUI 1300 of FIG. 13 may be presented. The GUI 1300 may include instructions 1302 indicating actions the person is to take while wearing the headset in order to engage in physical therapy using the headset's vibrators. The GUI 1300 may also include a selector 1304 that is selectable to move on to another physical therapy exercise after the one indicated via the instructions 1302 has been completed.

Figure 14:
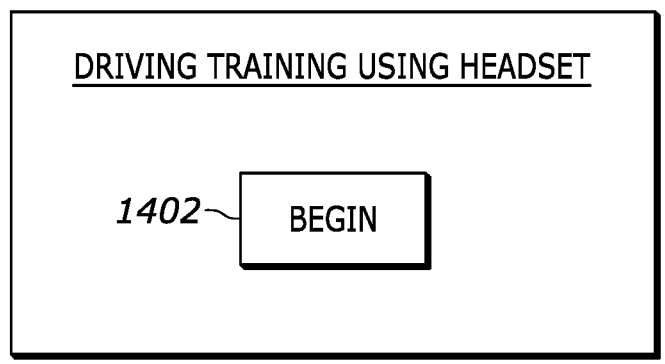
FIG. 14 shows an example GUI that may be presented on an AR headset display for a user to initiate a training process for a particular activity or task using the AR headset.
Figure 15:
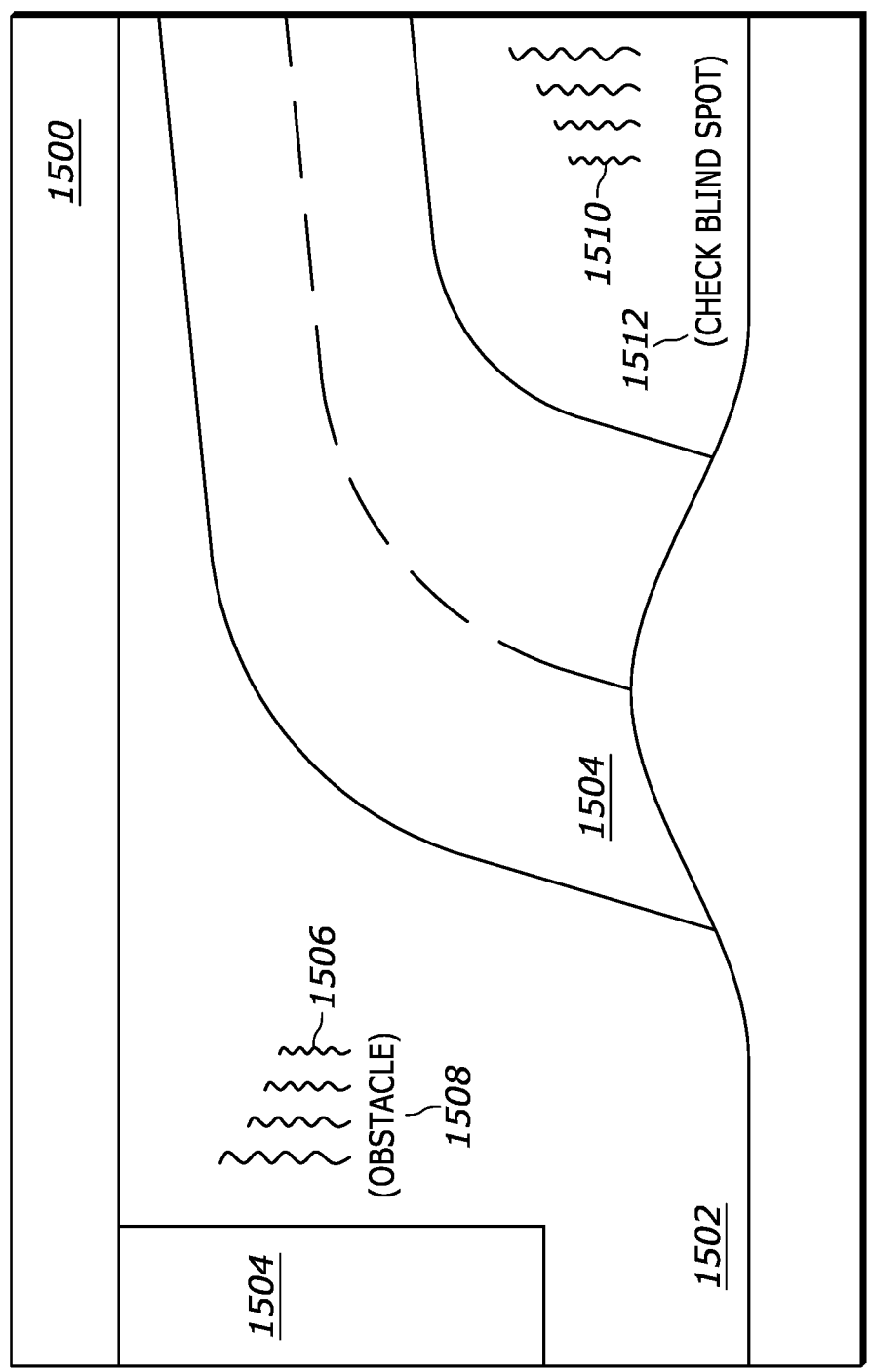
FIG. 15 shows an example illustration of the perspective of a person while wearing an AR headset and the headset providing vibrations during training consistent with present principles.

Now in reference to FIGS. 14 and 15, they show aspects of how a headset with vibrators might be used consistent with present principles for a training session for a person to learn how to drive a vehicle as described above in reference to the logic of FIG. 10. Referring first to FIG. 14, a GUI 1400 may be presented on the headset's display responsive to the person launching a training application or accessing an online training portal. The GUI 1400 may include a selector 1402 that may be selectable by voice command or staring to begin the training program.

The person may then begin driving the vehicle and, as shown in FIG. 15, view the real world environment 1500 surrounding the vehicle through the display 1502 of the headset. As shown, the person is driving down a road 1504 that veers to the right. To alert the person to a real world obstacle 1504 to the left of the vehicle, a vibrator on the left side of the headset may be actuated to produce vibrations illustrated by elements 1506. Text 1508 may also be presented on the headset's display 1502 to alert the person to the presence of the obstacle 1504.

As also shown in FIG. 15, as the person begins turning the vehicle to the right to follow the path of the road 1504, another vibrator on the right side of the headset may be actuated to produce vibrations illustrated by elements 1510 to indicate that the person should check the vehicle's blind spot before veering to the right. Text 1512 may also be presented on the display 1502 to remind the person to look in the vehicle's right-side blind spot.

Figure 16:
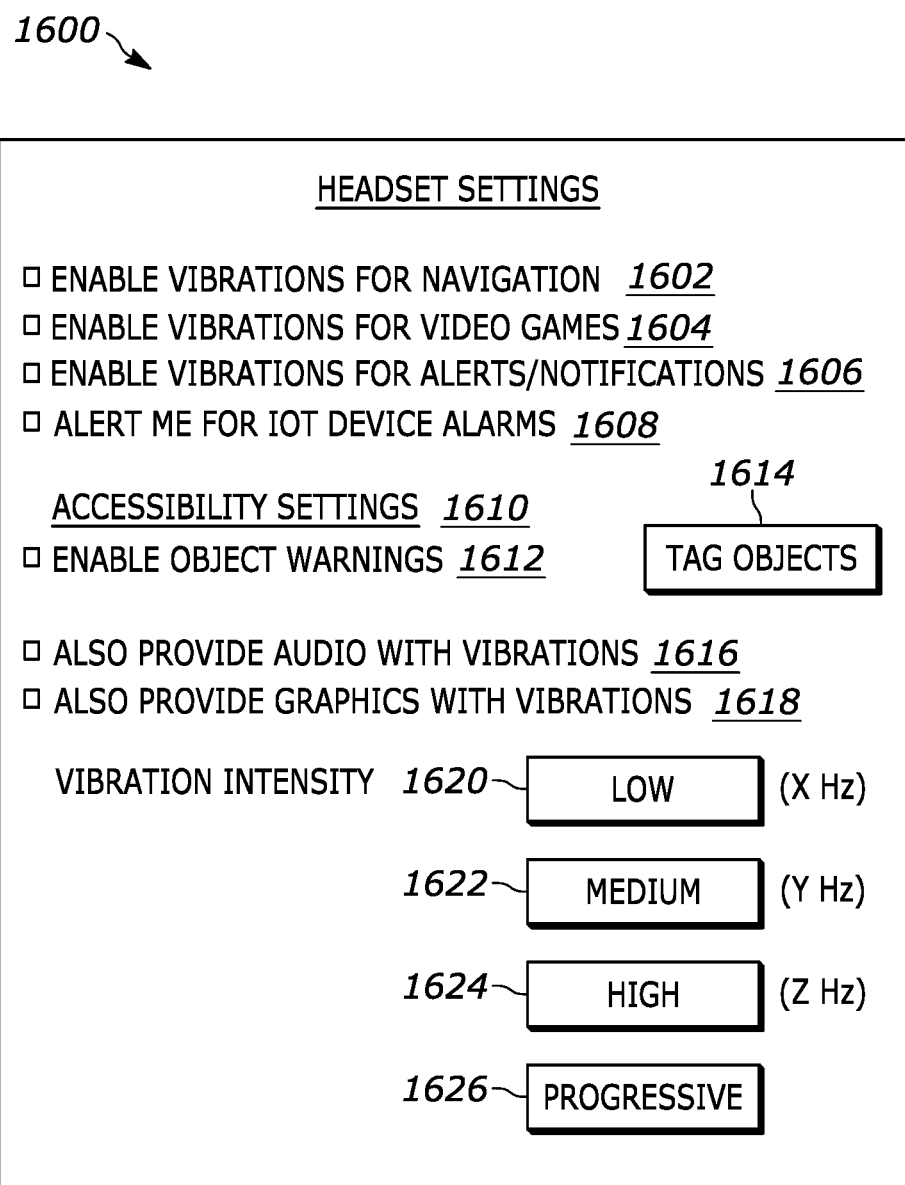
FIG. 16 shows an example GUI for configuring settings of a headset consistent with present principles.

Now in reference to FIG. 16, it shows an example GUI 1600 that may be presented on the display of a headset or another display (e.g., smart phone display) accessible to the headset to configure one or more settings of the headset consistent with present principles. It is to be understood that each option or sub-option to be described below may be selected by directing input to the adjacent check box to select the respective option (e.g., touch input or staring).

A first option 1602 is shown on the GUI 1600 and it may be selectable to configure the headset to provide vibrations useful for navigation about an environment consistent with present principles. The GUI 1600 also shows a second option 1604 that may be selectable to configure the headset to provide vibrations at the headset while a person plays video games consistent with present principles. As also shown in FIG. 16, the GUI 1600 may further include a third option 1606 that may be selectable to configure the headset to provide vibrations at the headset for various alerts and notifications that might be received or provided, such as text messages or electronic calendar alerts, consistent with present principles. The option 1606 may even include a sub-option 1608 that may be selectable to configure the headset to provide alerts for IoT device alarms when they occur, such as based on expiration of a timer on an IoT oven as described above.

FIG. 16 also shows that one or more accessibility settings 1610 may also be provided for configuration via the GUI 1600. For example, an option 1612 may be selected to enable an accessibility setting in which the headset may alert the person when the person comes within a threshold distance to various real world objects as described herein. A selector 1614 may even be presented that may be selectable to initiate a process where a person may tag particular objects for which to be alerted. For example, the selector 1614 may be selected to initiate the process described above in reference to FIG. 11.

Additionally, the GUI 1600 may include still other options such as an option 1616 to configure the headset to provide audio notifications along with vibration alerts/notifications for a given event or item. An option 1618 may also be selected to configure the headset to provide visual graphics alerts/notifications along with vibration notifications for a given event or item.

Still further, in some examples the GUI 1600 may include various selectors 1620, 1622, and 1624 to select particular vibration intensities for the headset to use by default or for a certain circumstance or determination. As shown, the GUI 1600 may indicate the intensities in terms of low, medium, and high, as well as by vibration intensity in Hertz. A selector 1626 may even be presented and be selectable to configure the headset to use a progressive vibration intensity in which vibration starts off with low intensity and progressively gets more intense as time goes on for a given alert/notification that is to be provided.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. An apparatus, comprising:
   a first headset, the first headset comprising:
   a housing;
   at least one processor in the housing;
   at least a first vibrator accessible to the at least one processor and coupled to the housing; and
   storage accessible to the at least one processor, coupled to the housing, and comprising instructions executable by the at least one processor to:
   track a first visually-impaired person as the first visually-impaired person walks along on a sidewalk;
   based on tracking the first visually-impaired person as the first visually-impaired person walks along the sidewalk, actuate the first vibrator at a first time to alert the first visually-impaired person of an object on the sidewalk that is within a threshold distance to the first headset;
   map the object to its current physical geolocation; and
   provide data indicating the current physical geolocation of the object to another device associated a second visually-impaired person different from the first visually-impaired person;
   wherein the other device is a second headset different from the first headset, wherein the storage is first storage, wherein the at least one processor is a first at least one processor, wherein the instructions are first instructions, wherein the sidewalk is a first sidewalk, wherein the apparatus comprises the second headset, wherein the housing is a first housing, and wherein the second headset comprises:
   a second housing;
   a second at least one processor, the second at least one processor being in the second housing;
   at least a second vibrator accessible to the second at least one processor and coupled to the second housing; and
   second storage accessible to the second at least one processor, coupled to the second housing, and comprising second instructions executable by the second at least one processor to:
   receive the data indicating the current physical geolocation of the object;
   track the second visually-impaired person as the second visually-impaired person walks along on the first sidewalk;
   based on tracking the second visually-impaired person as the second visually-impaired person walks along the first sidewalk, actuate the second vibrator at a second time to provide directions to divert the second visually-impaired person one or more of: to a second sidewalk different than the first sidewalk, away from the object;
   wherein the second time is subsequent to the first time.

2. The apparatus of claim 1, wherein the first instructions are executable to:
   track the first visually-impaired person using computer vision and input from a camera.

3. The apparatus of claim 1, wherein the second instructions are executable by the second at least one processor to:
   based on tracking the second visually-impaired person as the second visually-impaired person walks along the first sidewalk, actuate the second vibrator at the second time to provide directions to divert the second visually-impaired person to the second sidewalk different than the first sidewalk.

4. The apparatus of claim 1, wherein the second instructions are executable by the second at least one processor to:
   based on tracking the second visually-impaired person as the second visually-impaired person walks along the first sidewalk, actuate the second vibrator at the second time to provide directions to divert the second visually-impaired person away from the object.

5. The apparatus of claim 1, wherein the second instructions are executable by the second at least one processor to:
   based on tracking the second visually-impaired person as the second visually-impaired person walks along the first sidewalk, actuate the second vibrator at the second time to provide, while the object is out of view of a camera on the second headset, directions to divert the second visually-impaired person.

6. The apparatus of claim 5, wherein the second instructions are executable by the second at least one processor to:
   based on tracking the second visually-impaired person as the second visually-impaired person walks along the first sidewalk, actuate the second vibrator at the second time to provide directions to divert the second visually-impaired person and also actuate a speaker connected to the second headset to audibly notify the second visually-impaired person of the current physical geolocation of the object.

7. The apparatus of claim 5, wherein the second instructions are executable by the second at least one processor to:
   based on tracking the second visually-impaired person as the second visually-impaired person walks along the first sidewalk, actuate the second vibrator at the second time to provide directions to divert the second visually-impaired person and also actuate a speaker connected to the second headset to audibly notify the second visually-impaired person of a first distance to the current physical geolocation of the object.

8. A method, comprising:
tracking, using a first headset and computer vision, a first visually-impaired person as the first visually-impaired person walks along on a walkway;
based on tracking the first visually-impaired person as the first visually-impaired person walks along the walkway, actuating at least one vibrator on the first headset at a first time to alert the first visually-impaired person of an object on the walkway; and
mapping the object to its current physical geolocation on the walkway; and
providing data indicating the current physical geolocation of the object to another device associated a second visually-impaired person different from the first visually-impaired person;
wherein the other device is a second headset different from the first headset, wherein the walkway is a first walkway, and wherein method comprises:
receiving, at the second headset, the data indicating the current physical geolocation of the object;
tracking the second visually-impaired person as the second visually-impaired person walks along on the first walkway;
based on tracking the second visually-impaired person as the second visually-impaired person walks along the first walkway, actuating a second vibrator on the second headset at a second time to provide directions to divert the second visually-impaired person one or more of: to a second walkway different than the first walkway, away from the object;
wherein the second time is subsequent to the first time.

9. The method of claim 8, comprising:
tracking the first visually-impaired person using computer vision and input from a camera.

10. The method of claim 8, wherein the method comprises:
based on tracking the second visually-impaired person as the second visually-impaired person walks along the first walkway, actuating the second vibrator at the second time to provide directions to divert the second visually-impaired person to the second walkway different than the first walkway.

11. The method of claim 8, wherein the method comprises:
based on tracking the second visually-impaired person as the second visually-impaired person walks along the first walkway, actuating the second vibrator at the second time to provide directions to divert the second visually-impaired person away from the object.

12. The method of claim 8, wherein the method comprises:
based on tracking the second visually-impaired person as the second visually-impaired person walks along the first walkway, actuating the second vibrator at the second time to provide directions to divert the second visually-impaired person notwithstanding the object being out of view of a camera on the second headset.

13. The method of claim 12, comprising:
based on tracking the second visually-impaired person as the second visually-impaired person walks along the first walkway, actuating the second vibrator at the second time to provide directions to divert the second visually-impaired person and also actuating a speaker connected to the second headset to audibly notify the second visually-impaired person of the current physical geolocation of the object.

14. At least one computer readable storage medium (CRSM) that is not a transitory signal, the computer readable storage medium comprising instructions executable by at least one processor to:
track a first visually-impaired person as the first visually-impaired person walks along a surface;
based on tracking the first visually-impaired person as the first visually-impaired person walks along the surface, actuate, at a first time, at least one vibrator on a first device associated with the first visually-impaired person to alert the first visually-impaired person of an object on the surface;
identify a current physical geolocation of the object; and
provide data indicating the current physical geolocation of the object to a second device associated a second visually-impaired person different from the first visually-impaired person;
wherein the surface is a first surface, and wherein the instructions are executable to:
receive, at the second device, the data indicating the current physical geolocation of the object;
track the second visually-impaired person as the second visually-impaired person walks along on the first surface;
based on tracking the second visually-impaired person as the second visually-impaired person walks along the first surface, actuate a second vibrator on the second device at a second time to provide directions to divert the second visually-impaired person one or more of: to a second surface different than the first surface, away from the object;
wherein the second time is subsequent to the first time.

* * * * *